United States Patent
Liu

(10) Patent No.: US 11,119,344 B2
(45) Date of Patent: Sep. 14, 2021

(54) MANUFACTURING METHOD OF FLEXIBLE DISPLAY, FLEXIBLE DISPLAY, AND DISPLAY DEVICE

(71) Applicant: BOE Technology Group Co., Ltd., Beijing (CN)

(72) Inventor: Zheng Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 393 days.

(21) Appl. No.: 16/094,453

(22) PCT Filed: Jan. 4, 2018

(86) PCT No.: PCT/CN2018/071324
§ 371 (c)(1),
(2) Date: Oct. 17, 2018

(87) PCT Pub. No.: WO2018/209976
PCT Pub. Date: Nov. 22, 2018

(65) Prior Publication Data
US 2021/0072586 A1  Mar. 11, 2021

(30) Foreign Application Priority Data
May 15, 2017  (CN) .......................... 201710339636.2

(51) Int. Cl.
*G02F 1/1333* (2006.01)
(52) U.S. Cl.
CPC ...... *G02F 1/1333* (2013.01); *G02F 1/133305* (2013.01); *G02F 2202/16* (2013.01)

(58) Field of Classification Search
None
See application file for complete search history.

(56) References Cited

U.S. PATENT DOCUMENTS

| 9,276,055 B1 | 3/2016 | Son et al. |
| 2007/0134473 A1 | 6/2007 | Kim |
| 2009/0167735 A1* | 7/2009 | Lee ..................... H01L 23/4985 345/206 |
| 2014/0217397 A1* | 8/2014 | Kwak ................. H01L 27/1218 257/43 |

(Continued)

FOREIGN PATENT DOCUMENTS

| CN | 1984524 A | 6/2007 |
| CN | 101470279 A | 7/2009 |

(Continued)

OTHER PUBLICATIONS

Search Report and Written Opinion issued in corresponding International Application PCT/CN2018/071324, dated Mar. 30, 2018.

(Continued)

*Primary Examiner* — Shan Liu
(74) *Attorney, Agent, or Firm* — McDermott Will & Emery LLP

(57) ABSTRACT

A manufacturing method of a flexible display, a flexible display, and a display device are provided. The method comprises: forming a metal lead on a flexible substrate; bending the flexible substrate and the metal lead; and forming a conductive film layer on the metal lead, which covers at least a bent part of the metal lead.

11 Claims, 3 Drawing Sheets

(56) References Cited

U.S. PATENT DOCUMENTS

2016/0285046 A1* 9/2016 Son ..................... H01L 27/3276
2017/0241039 A1* 8/2017 Takai ................... C25D 7/0614

FOREIGN PATENT DOCUMENTS

| | | |
|---|---|---|
| CN | 101852932 A | 10/2010 |
| CN | 103558939 A | 2/2014 |
| CN | 104600029 A | 5/2015 |
| CN | 106086836 A | 11/2016 |
| CN | 106252380 A | 12/2016 |
| CN | 106297966 A | 1/2017 |
| EP | 2076097 A2 | 7/2009 |
| KR | 20010038397 A | 5/2001 |
| KR | 20030048770 A | 6/2003 |

OTHER PUBLICATIONS

Office Action issued in corresponding Chinese Patent Application No. 201710339636.2, dated Dec. 11, 2018.

* cited by examiner

MANUFACTURING METHOD OF FLEXIBLE DISPLAY, FLEXIBLE DISPLAY, AND DISPLAY DEVICE

CROSS-REFERENCE TO RELATED APPLICATION

This application is a national stage entry of International Application No. PCT/CN2018/071324, filed on Jan. 4, 2018, which claims the benefit of priority of Chinese Application No. 201710339636.2 filed on May 15, 2017, the entire contents of which are hereby incorporated by reference.

TECHNICAL FIELD

This disclosure relates to the technical field of TFT-LCDs and specifically provides a manufacturing method of a flexible display, a flexible display, and a display device.

BACKGROUND

One of the requirements for electronic products is lightening and thinning, and the designs for the size and weight of a display device are important considerations in a production process of an electronic device. The attraction of a display device may be largely improved by allowing the display device to have a reduced border or no border.

SUMMARY

This disclosure provides a manufacturing method of a flexible display, a flexible display, and a display device.

Specifically, this disclosure discloses a manufacturing method of a flexible display, comprising:
  forming a metal lead on a flexible substrate;
  bending the flexible substrate and the metal lead; and
  forming a conductive film layer on the metal lead, which covers at least a bent part of the metal lead.

Optionally, said forming a conductive film layer on the metal lead comprises: forming a conductive film layer on the metal lead by using an electroplating method or a chemical plating method.

Optionally, said forming a conductive film layer on the metal lead by using a chemical plating method comprises:
  immersing the bent part of the metal lead in a chemical solution, wherein the chemical solution comprises a metal salt and a reducing agent; and
  performing a reduction reaction between the metal salt and the reducing agent in the chemical solution to form the conductive film layer on a surface of the bent part of the metal lead.

Optionally, the metal salt comprises at least one of copper sulfate, copper chloride, and copper nitrate.

Optionally, copper ions in the chemical solution have a concentration of approximately 2.5 g/L to 10 g/L.

Optionally, the reducing agent comprises at least one of formaldehyde and hypophosphites.

Optionally, the chemical solution further comprises a complexing agent, which comprises at least one of triethanolamine and tartaric acid.

Optionally, the chemical solution further contains a pH adjusting agent, which comprises one of sodium hydroxide, potassium hydroxide, and sulfuric acid, or a mixture of sodium hydroxide and potassium hydroxide.

Optionally, the conductive film layer has a thickness of approximately 0.2 µm to 10 µm.

Optionally, the conductive film layer comprises one or more metals of nickel, gold, silver, tin, and copper, or comprises one or more alloys formed of two or more metals of nickel, gold, silver, tin, and copper.

Optionally, the conductive film layer completely covers the outer surface of the metal lead.

This disclosure further discloses a flexible display, comprising:
  a flexible substrate;
  a metal lead, which is on the flexible substrate and bent along with the flexible substrate; and
  a conductive film layer, which is on an outer surface of the metal lead and covers at least a bent part of the metal lead.

Optionally, the conductive film layer completely covers the outer surface of the metal lead.

Optionally, the conductive film layer has a thickness of approximately 0.2 µm to 10 µm.

Optionally, the conductive film layer comprises one or more metals of nickel, gold, silver, tin, and copper, or comprises one or more alloys formed of two or more metals of nickel, gold, silver, tin, and copper.

This disclosure further discloses a display device, comprising the flexible display described above.

DESCRIPTION OF EMBODIMENTS

In order to enable the objects, features, and advantages of this disclosure described above to be more remarkably and easily understood, this disclosure will be further illustrated in detail below in conjunction with accompanying drawings and specific embodiments.

In the effort for lightening and thinning the electronic products, with respect to a flexible display product, since it has the property of bendability, it is a method to bend the edge position of the bottom border backwards to the back side so as to reduce the size of the bottom border. However, there is an obvious problem with this technique that cracking will easily occurs and cracks extend in the process of production and use of a material of a bent area, leading to problems of reduced reliability of a display device, or even open circuits of the circuit connecting wires and device failure.

Figure 1:
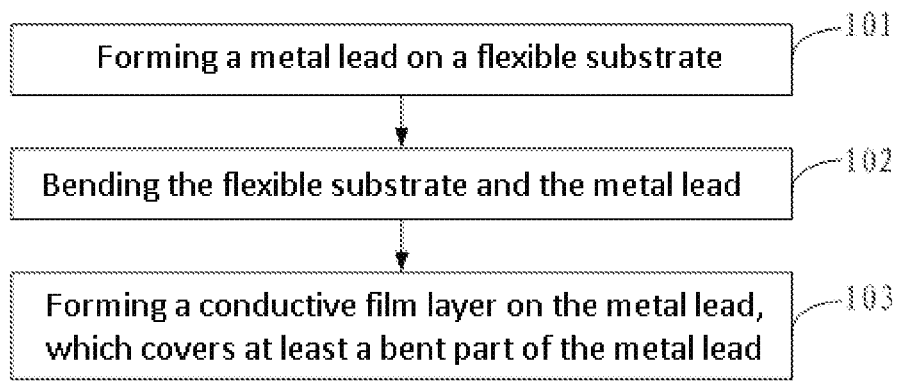
FIG. 1 shows a flow chart of the steps of a manufacturing method of a flexible display according to an example of this disclosure.

With reference to FIG. 1, there is shown a flow chart of the steps of a manufacturing method of a flexible display provided in Example 1 of this disclosure. The method comprises:

Step 101, forming a metal lead on a flexible substrate.

Figure 2:
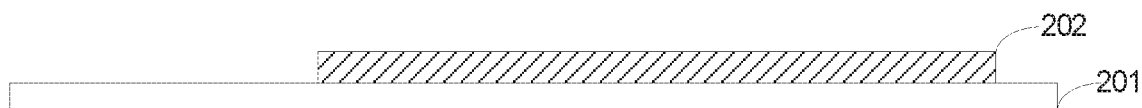
FIG. 2 shows a sectional schematic diagram of a flexible substrate formed with a metal lead according to an example of this disclosure.

In this Example, a flexible substrate 201 was formed according to a conventional process, and a metal lead 202 was formed of a first or second metal layer of a display area on the flexible substrate 201. As shown in FIG. 2, there is a flexible substrate 201 formed with a metal lead 202.

Step 102, bending the flexible substrate and the metal lead.

Figure 3A:
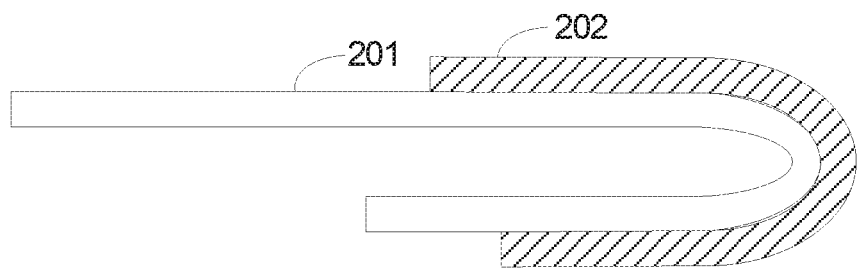
FIG. 3a shows a first sectional schematic diagram of a bent flexible substrate according to an example of this disclosure.
Figure 3B:
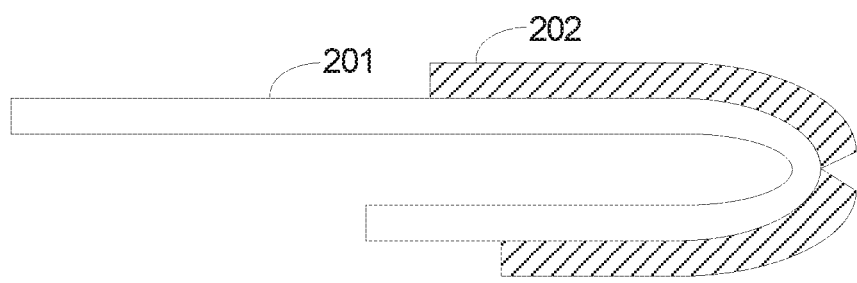
FIG. 3b shows a second sectional schematic diagram of a bent flexible substrate according to an example of this disclosure.

In this Example, after the metal lead 202 was formed on the flexible substrate 201, the flexible substrate 201 and the metal lead 202 were bent to reduce the sizes of the borders of a flexible display. As shown in FIG. 3a, there is a bent flexible substrate 201. The metal lead 202 may break in the process of bending, or may break in the process of subsequent use. As shown in FIG. 3b, there is a bent flexible substrate. The breaking of the metal lead 202 will lead to open circuits, device failure, and the like.

Step 103, forming a conductive film layer on the metal lead, which covers at least a bent part of the metal lead.

Figure 4:
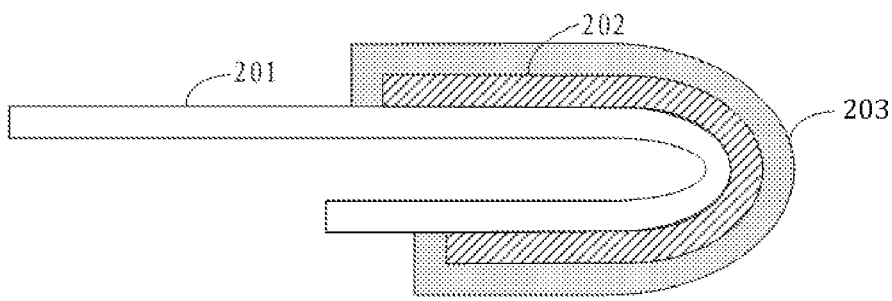
FIG. 4 shows a sectional schematic diagram of a flexible display according to an example of this disclosure.

In this Example, a conductive film layer 203 was formed on the metal lead 202, and the conductive film layer 203 covered at least a bent part of the metal lead 202. As shown in FIG. 4, there is a sectional schematic diagram of a flexible display. Since the conductive film layer 203 is formed at a bent part of the metal lead 202, the conductive film layer 203 may be still conductive even if the metal lead 202 breaks at the bent part. Therefore, the problems such as open circuits, device failure, and the like caused by the breaking of the metal lead 202 are prevented. According to some Examples of this disclosure, a conductive film layer is formed on the metal lead by using an electroplating method or a chemical plating method.

In summary, in Examples of this disclosure, a metal lead is formed on a flexible substrate; the flexible substrate and the metal lead are bent; and a conductive film layer is formed on the metal lead, which covers at least a bent part of the metal lead. Since the conductive film layer is formed at a bent part of the metal lead, the conductive film layer may be still conductive even if the metal lead breaks after bending. Therefore, the problems such as open circuits, device failure, and the like caused by the breaking of the metal lead are prevented. While the sizes of the borders of a display device are reduced, the reliability of the display device is improved, so that the problems such as device failure and reduced reliability caused by the breaking of a material of a bent area are avoided.

Figure 5:
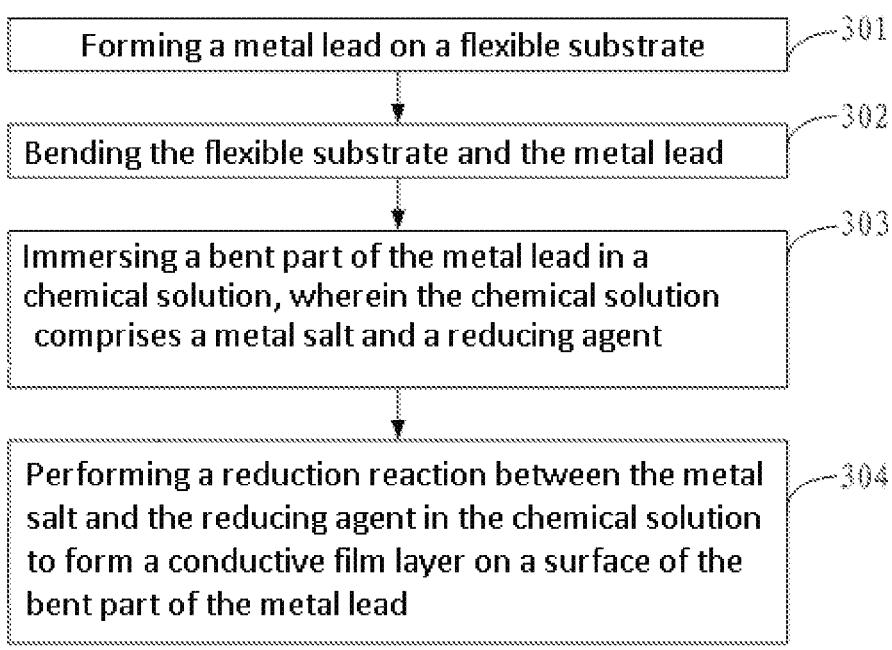
FIG. 5 shows a flow chart of the steps of a manufacturing method of a flexible display according to another example of this disclosure.

With reference to FIG. 5, there is shown a flow chart of the steps of a manufacturing method of a flexible display provided in Example 1 of this disclosure. The method comprises:

Step 301, forming a metal lead on a flexible substrate.

Step 302, bending the flexible substrate and the metal lead.

The above steps are similar to the contents of Steps 101-102 in the above example, and verbose words are omitted herein.

Step 303, immersing a bent part of the metal lead in a chemical solution, wherein the chemical solution comprises a metal salt and a reducing agent.

Figure 6:
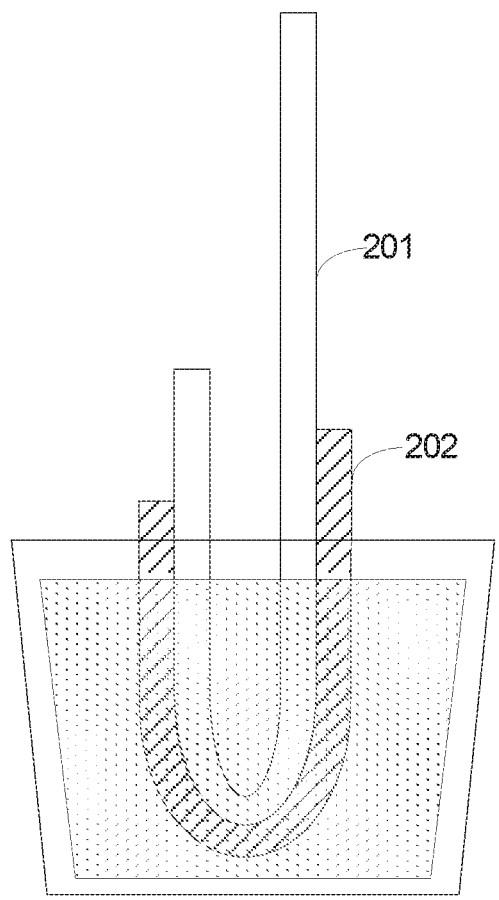
FIG. 6 shows a schematic diagram of immersing the bent part of a metal lead in a chemical solution according to another example of this disclosure.

In this Example, a conductive film layer 203 was formed on a metal lead 202 by using a chemical plating method, and particularly, a bent part of a metal lead 202 was immersed in a chemical solution. As shown in FIG. 6, there is a schematic diagram of immersing a bent part of a metal lead in a chemical solution. Optionally, the metal lead may be completely immersed in the chemical solution.

Step 304, performing a reduction reaction between the metal salt and the reducing agent in the chemical solution to form a conductive film layer on a surface of the bent part of the metal lead.

In this Example, the chemical solution comprised a metal salt and a reducing agent, and a reduction reaction between the metal salt and the reducing agent is performed to form a conductive film layer 203 on a surface of the bent part of the metal lead 202.

According to some Examples of this disclosure, the metal salt comprises at least one of copper sulfate, copper chloride, and copper nitrate. When copper is plated at a bent part of the metal lead 202 by using a chemical plating method, the metal salt in the chemical solution is a salt of metal copper and at least one of copper sulfate, copper chloride, and copper nitrate may be selected.

According to some Examples of this disclosure, copper ions in the chemical solution have a concentration of 2.5 g/L to 10 g/L. When the metal salt in the chemical solution is a salt of metal copper, the concentration of copper ions in the chemical solution are controlled to be 2.5 g/L to 10 g/L, so as to control the speed of the reduction reaction and the thickness of the conductive film layer 203 formed.

According to some Examples of this disclosure, the reducing agent comprises at least one of formaldehyde and hypophosphites.

According to some Examples of this disclosure, the chemical solution further comprises a complexing agent, which comprises at least one of triethanolamine and tartaric acid. The complexing agent in the chemical solution serves to stabilizing a plating solution or refining crystal grains of a plating layer to allow the conductive film layer 203 formed to have a uniform thickness.

According to some Examples of this disclosure, the chemical solution further comprises a pH adjusting agent, which comprises one of sodium hydroxide, potassium hydroxide, and sulfuric acid, or a mixture of sodium hydroxide and potassium hydroxide.

According to some Examples of this disclosure, the conductive film layer has a thickness of 0.2 μm to 10 μm.

According to some Examples of this disclosure, the conductive film layer comprises one or more metals of nickel, gold, silver, tin, and copper, or comprises one or more alloys formed of two or more metals of nickel, gold, silver, tin, and copper. In a chemical plating method, one or more metals of nickel, gold, silver, tin, copper, and the like, or an alloy of two or more of these metals, may also be plated on the metal lead 202. This is not limited in detail in Examples of this disclosure, and may be set according to practical situations.

In summary, in Examples of this disclosure, a metal lead is formed on a flexible substrate; the flexible substrate and the metal lead are bent; a bent part of the metal lead is immersed in a chemical solution; and a reduction reaction between the metal salt and the reducing agent in the chemical solution is performed to form a conductive film layer on a surface of a bent part of the metal lead. Since the conductive film layer is formed at a bent part of the metal lead, the conductive film layer may be still conductive even if the metal lead breaks after bending. Therefore, the problems such as open circuits, device failure, and the like caused by the breaking of the metal lead are prevented. While the sizes of the borders of a display device are reduced, the reliability of the display device is improved, so that the problems such as device failure and reduced reliability caused by the breaking of a material of a bent area are avoided.

Further, by forming a conductive film layer by using a chemical plating method, the process equipment is simple, the thickness of the conductive film layer is uniform, and the performance is good.

With reference to FIG. 4, there is shown a flexible display provided in an Example of this disclosure. The flexible display comprises:

a flexible substrate 201;

a metal lead 202 formed on the flexible substrate 201, wherein the metal lead 202 may be provided to be bent along with the flexible substrate 201; and a conductive film layer 203, which is on an outer surface of the metal lead 202 and covers at least a bent part of the metal lead 201.

According to some Examples of this disclosure, the conductive film layer 203 completely covers the outer surface of the metal lead 202.

According to some Examples of this disclosure, the conductive film layer 203 has a thickness of 0.2 μm to 10 μm.

According to some Examples of this disclosure, the conductive film layer 203 is composed of one or more metals selected from nickel, gold, silver, tin, and copper, or is composed of one or more alloys formed of two or more metals selected from nickel, gold, silver, tin, and copper.

In summary, in Examples of this disclosure, the flexible display comprises a flexible substrate and a metal lead formed on the flexible substrate, wherein the metal lead may be provided to be bent along with the flexible substrate; and a conductive film layer is formed on an outer surface of the metal lead, and the conductive film layer covers at least a bent part of the metal lead. Since the conductive film layer is formed at a bent part of the metal lead, the conductive film layer may be still conductive even if the metal lead breaks after bending. Therefore, the problems such as open circuits, device failure, and the like caused by the breaking of the metal lead are prevented. While the sizes of the borders of a display device are reduced, the reliability of the display device is improved, so that the problems such as device failure and reduced reliability caused by the breaking of a material of a bent area are solved.

An example of this disclosure provides a display device, comprising the above flexible display.

In summary, in Examples of this disclosure, the display device comprises a flexible display. The flexible display comprises a flexible substrate and a metal lead formed on the flexible substrate, wherein the metal lead may be provided to be bent along with the flexible substrate; and a conductive film layer is formed on an outer surface of the metal lead, and the conductive film layer covers at least a bent part of the metal lead. Since the conductive film layer is formed at a bent part of the metal lead, the conductive film layer may be still conductive even if the metal lead breaks after bending. Therefore, the problems such as open circuits, device failure, and the like caused by the breaking of the metal lead are prevented. While the sizes of the borders of a display device are reduced, the reliability of the display device is improved, so that the problems such as device failure and reduced reliability caused by the breaking of a material of a bent area are avoided.

Various Examples in this specification are all described in a progressive manner. Each of the Examples emphatically illustrates those different from other Examples, and the same or similar parts between Examples can be referred to each other.

Finally, it is to be further indicated that the relational terms such as first, second, and the like are merely to distinguish one entity or operation from another entity or operation, and it does not necessarily require or imply that there is any actual relation or order between these entities and operations. Additionally, the terms "include", "comprise", or any other variant, intend to cover nonexclusive inclusion, such that a process, method, merchandise, or device comprising a range of elements comprises not only those elements, but also other elements which are not specifically listed or elements intrinsically possessed by this process, method, merchandise, or device. In absence of more limitations, an element defined by a sentence "comprise a" does not exclude that there is additionally the same element in a process, method, merchandise, or device comprising this element.

A manufacturing method of a flexible display, a flexible display, and a display device provided in this disclosure are introduced in detail above, particular examples are used herein to elaborate the principle and the embodiment of this disclosure, and the description of the above Examples is only used to help the understanding of the method of this disclosure and the core idea thereof. At the meanwhile, with respect to those of ordinary skill in the art, modifications will be made to specific embodiments and application ranges according to the idea of this disclosure. In summary, the contents of this specification should not be construed as limiting this disclosure.

What is claimed is:

1. A manufacturing method of a flexible display, comprising:

forming a metal lead on a flexible substrate;

bending the flexible substrate and the metal lead; and forming a conductive film layer on the metal lead by using a chemical plating method, which covers at least a bent part of the metal lead, wherein said forming a conductive film layer on the metal lead by using a chemical plating method comprises:

immersing the bent part of the metal lead in a chemical solution, wherein the chemical solution comprises a metal salt and a reducing agent; and performing a reduction reaction between the metal salt and the reducing agent in the chemical solution to form the conductive film layer on a surface of the bent part of the metal lead.

2. The method according to claim 1, wherein the metal salt comprises at least one of copper sulfate, copper chloride, and copper nitrate.

3. The method according to claim 2, wherein copper ions in the chemical solution have a concentration of approximately 2.5 g/L to 10 g/L.

4. The method according to claim 1, wherein the reducing agent comprises at least one of formaldehyde and hypophosphites.

5. The method according to claim 1, wherein the chemical solution further comprises a complexing agent, which comprises at least one of triethanolamine and tartaric acid.

6. The method according to claim 1, wherein the chemical solution further contains a pH adjusting agent.

7. The method according to claim 6, wherein the pH adjusting agent comprises one of sodium hydroxide, potassium hydroxide, and sulfuric acid.

8. The method according to claim 6, wherein the pH adjusting agent comprises a mixture of sodium hydroxide and potassium hydroxide.

9. The method according to claim 1, wherein the conductive film layer has a thickness of approximately 0.2 µm to 10 µm.

10. The method according to claim 1, wherein the conductive film layer comprises one or more metals of nickel, gold, silver, tin, and copper, or comprises one or more alloys formed of two or more metals of nickel, gold, silver, tin, and copper.

11. The method according to claim 1, wherein the conductive film layer completely covers the outer surface of the metal lead.

* * * * *